United States Patent [19]

Solarz et al.

[11] Patent Number: 4,460,298

[45] Date of Patent: Jul. 17, 1984

[54] SELF RETAINING THREADED SCREW GROMMET

[75] Inventors: Gilbert Solarz, Des Plaines; Francis G. Frano, Hoffman Estates, both of Ill.

[73] Assignee: Illinois Tool Works Inc., Chicago, Ill.

[21] Appl. No.: 363,182

[22] Filed: Mar. 29, 1982

Related U.S. Application Data

[63] Continuation-in-part of Ser. No. 270,062, Jun. 3, 1981, abandoned.

[51] Int. Cl.³ .......................................... F16B 13/06
[52] U.S. Cl. ...................................... 411/15; 411/59; 411/182; 411/908
[58] Field of Search .................... 411/15, 57–62, 411/179, 182, 436, 437, 508–510

[56] References Cited

U.S. PATENT DOCUMENTS

| | | | |
|---|---|---|---|
| 2,836,214 | 5/1958 | Rapata | 411/182 |
| 3,212,387 | 10/1965 | Madansky | 411/908 |
| 3,508,593 | 4/1970 | Gill | 411/182 |
| 4,070,945 | 1/1978 | Kurosaki | 411/182 |
| 4,240,323 | 12/1980 | Kojima | 411/15 |

FOREIGN PATENT DOCUMENTS

| | | | |
|---|---|---|---|
| 1122378 | 5/1956 | France | 411/908 |

*Primary Examiner*—Gary L. Smith
*Assistant Examiner*—Neill Wilson
*Attorney, Agent, or Firm*—Thomas W. Buckman; John P. O'Brien

[57] ABSTRACT

A one-piece self-retaining threaded plastic screw grommet including a head and bifurcated shank having a through bore through the head and shank. The slots which bifurcate said shank being generally tangentially disposed on opposite sides of the axis of said bore and the free end of said legs being interconnected by non-linear bendable web means that restrain the spreading of the legs when a complimentary screw is inserted within the bore.

4 Claims, 8 Drawing Figures

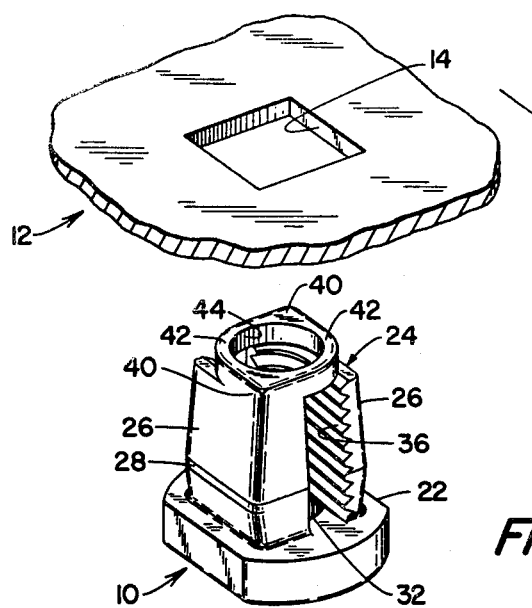
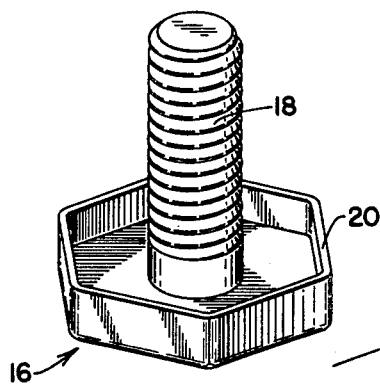
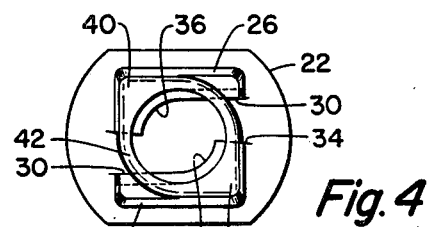
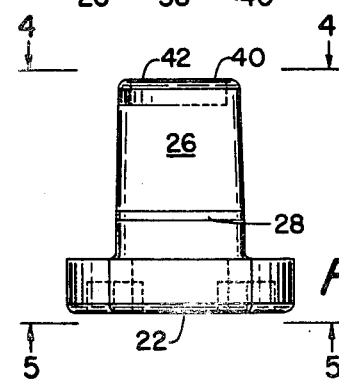
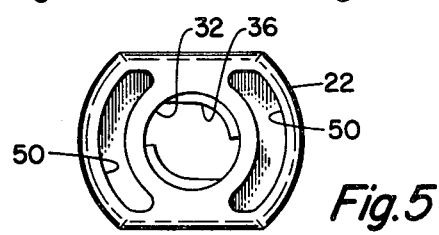

SELF RETAINING THREADED SCREW GROMMET

This application is a continuation-in-part application of application Ser. No. 270062, filed June 3, 1981, now abandoned.

BACKGROUND OF THE INVENTION

This invention relates to a one-piece plastic screw grommet. Some of the earlier work on plastic screw grommets is represented by the patents to George M. Rapata, namely, U.S. Pat. Nos. 2,788,047 and 2,836,214. In each of these patents there are devices described which are integrally molded from plastic material, inserted into a non-circular aperture in a workpiece and through its complimentary configuration rotation is prevented by the matching flat surfaces of the aperture and grommet. Such devices have been extensively commercialized around the world and have proven to be highly successful for purposes of joining two panels together. They initially utilized a bifurcated leg member having an unthreaded interior bore that accommodated a thread forming or thread cutting screw that formed its own threads on the interior of the legs and forced them laterally into engagement with the edges of the support panel aperture. A more recent development is represented by the patent to Kojima, U.S. Pat. No. 4,240,323 which is related to the disclosure of the earlier Rapata U.S. Pat. No. 2,788,047 with the exception that the slots forming the bifurcations being generally tangentially disposed relative to the bore of the fastener so as to prevent access of a misaligned screw into the slots.

Most of the prior art, including those referenced above, utilize the expansive qualities created by introduction of a screw to spread the legs into engagement with the edges of the panel aperture, however, such expansion generally resulted in a relieving of engagement with the screw adjacent the free ends of the bifurcated legs thereby lessening the gripping power of the screw relative to the fastener with respect to axially directed loads. In certain applications, it is desirable to provide an axially directed load against the head of the fastener which then places a compressive load against the head of the plastic screw grommet as well as transmitting this load to the threads on the interior of the bore. In those instances previously described where the screw formed its own threads and formed only a partial thread adjacent the free extremities of the bifurcated shank legs due to the expansion behind the panel resulted in a fastener which would not accept such compressive loads since the imperfectly formed threads would shear and result in failure of the fastener.

SUMMARY OF THE INVENTION

The present invention is directed to a one-piece plastic screw grommet having internal threads formed at the time of the molding operation and which economically can be fabricated without the necessity of secondary cutting of the threads in its bore. An object of the present invention is to provide such a fastener.

The present invention accomplishes this by providing a one-piece threaded plastic screw grommet having a head and a bifurcated shank with slots forming the bifurcation being generally tangentially disposed relative to the through bore and with each slot being disposed on opposite sides of a plane falling on the axis of the bore. Additionally, the present invention contemplates a grommet wherein the free extremities of each of the legs are interconnected by flexible restraining means which permits free passage of the screw while permitting bendability of the legs so that they can be moved toward one another during insertion in the aperture and yet prevents undue expansion of the legs when a screw is inserted therein so as to insure full thread engagement and thereby accept an axially directed compressive load. These multiple objects of the invention will be apparent to those skilled in the art when the accompanying drawing is viewed in relation to the complete specification.

BRIEF DESCRIPTION OF THE DRAWINGS

FIG. 1 is an expanded perspective view of an exemplary embodiment of the present invention and shown in the expanded view with a support aperture and screw of the type to be used therewith;

FIG. 2 is a side elevational view of the embodiment shown in FIG. 1;

FIG. 3 is a side elevational view of the same embodiment rotated 90° from FIG. 2;

FIG. 4 is an end view taken along line 4—4 in FIG. 3;

FIG. 5 is a head end view of the fastener taken along line 5—5 in FIG. 3;

DETAILED SPECIFICATION

Figure 6:
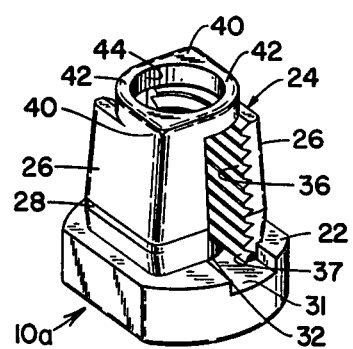
FIG. 6 is an expanded perspective view of a second embodiment of the instant invention shown in an expanded view with a support aperture and screw of the type to be used therewith.

Referring now to the drawing wherein similar parts are designated by similar numerals, as seen in the embodiment as shown in FIG. 1-5, a screw grommet 10 of the type contemplated by the present invention can be used with a work panel 12 having a complimentary non-circular aperture 14; and an adjusting foot 16 that includes a screw 18 and an enlarged head 20 for distribution of a load over an enlarged area. Adjusting feet of this type are commonly found in home appliances such as refrigerators, washers and dryers. The illustrated form has a generally hexagonal configuration for ease in wrenching the screw to a desired axial positionment within the screw grommet 10.

Both of the depicted embodiments of the present invention are a one-piece plastic injection molded screw grommet. In the first embodiment, FIG. 1-5, the grommet has a head 22 and an integral shank 24 defined by a pair of legs 26. Each of the legs 26 taper from the free end to an intermediate point 28 to form a shoulder means. While one form of shoulder means 28 has been defined, it will be recognized by those skilled in the art that protuberances, i.e., independent abrupt shoulder means, can also be utilized for purposes of retaining the legs 26 within the aperture 14.

As seen in FIG. 4, the shank 24 is bifurcated by a pair of slots 30. The slots 30 are generally tangential to the axially extending bore 32, as best seen in FIG. 4, that completely traverses the head 22 and shank 24. Each slot 30 is relatively wide at its mouth and tapers inwardly, as indicated at 34, towards the through bore. By being slightly tapered, each slot, as indicated at 34, will permit a single tool to be introduced from opposite sides to form thread means 36 on the interior of each leg 26 as defined by the bore 32 and the slots 30. This generally J-shaped configuration of threads in each leg 26 provides a substantial amount of thread engagement with a screw 18 introduced through the head 22. In the embodiment as shown in FIG. 1-5 the bore 32 in the head 22 is unthreaded thereby permitting unrestricted insertion of the screw 18. It will be appreciated by those skilled in the art that this configuration permits the use of a side action tool for formation of the threads during the molding operation. Thus there is no need of any rotary motion for thread formation. Additionally, as an alternative construction, the portion of the threads shown as being formed in the slots 30 could be a relieved area in the legs 26 with the threads 36 formed solely within the bore 32.

Each leg includes an axial extension 40 generally located in opposite corners of the shank 24. Each of these extensions or pillars 40 are substantially rigid and have interconnected to them at least one flexible restraining member 42. In the present embodiment the retaining members 42 are curvilinear flexible web-like members that define, along with a curved interior surface on pillar 40, a through bore 44 that is coaxial with the bore 32 and greater in diameter than the screw 18 so that when the screw projects axially outwardly beyond the free end of the grommet it will readily pass through the enlarged bore 44.

For conservation of material and assistance in molding, the head 22 can be relieved by a pair of grooves 50. It should be recognized, however, that such grooves 50 have no functional relationship to the primary invention.

Figure 8:
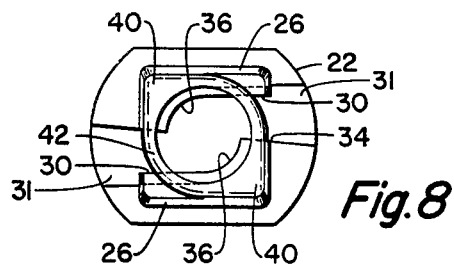
FIG. 8 is an end view of the embodiment shown in FIG. 7.
Figure 7:
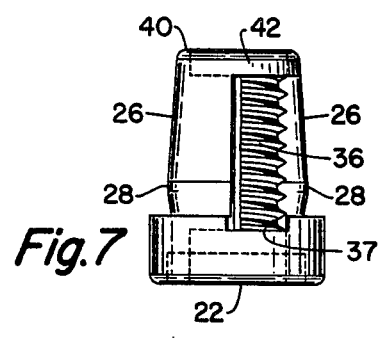
FIG. 7 is a side elevational view of the embodiment shown in FIG. 6.

Referring now to the embodiment shown in FIGS. 6-8 it will be noted that structure similar to that described in regard to the the embodiment shown in FIGS. 1-5 is referred to by the same numeral with the inclusion of a subscript "a". As best seen in FIGS. 6 and 7, each of the slots 30a extend into the head 22a as shown at 31 thereby providing access to a pair of thread segments 37 which are a natural continuation of a set of threads previously indicated as threads 36. The grommet 10a of this embodiment is formed in the same manner as the embodiment of FIGS. 1-5, i.e., the mold is of a side action type with the unthreaded ends 32 and 44 formed by core pins.

In the use of this invention, the grommet 10, 10a is axially telescoped into a complimentary aperture 14 in a support panel 12. As it is introduced the edges of the aperture 14 will ride up the tapered sides of legs 26, 26a until they pass the retaining shoulder means 28, 28a and then ride down the reverse slope of the legs 26, 26a towards the head 22, 22a. Of course it will be recognized that the legs 26, 26a will flex inwardly toward one another causing a distortion of the restraining web-like means 42, 42a. After the grommet has bottomed the head against one surface of the panel 12, the inherent spring-like nature of the web means 42, 42a will cause the legs to expand outwardly with the shoulder means 28, 28a underlying the opposite side of the panel. A leveling foot 16 can then be threaded into the grommet wherein the screw 18 will engage the thread means 36, 36a and the desired location of the head 20 can be arranged. When an axial load is imposed on the head 20, of the leveling foot 16, in the direction of the arrow "F", as shown in FIGS. 1, the prior art devices would tend to separate the legs adjacent their free ends. However, in the present invention the arcuate web-like members 42, 42a restrain the legs 26, 26a from such separation and substantially total thread engagement is effected along the entire axial disposition of the threads 36, 36a as they encounter the screw 18 thereby providing adequate support for the load being carried by the panel 12. In certain applications where the axial load imposed on the head is substantial, the second embodiment has been found to have increased resistance to ratcheting of the screw 18 through the grommet due to thread segments 37 in the substantially rigid head 22a.

The device, by its design is capable of being self-retained in the aperture 14 since its legs, after collapse during insertion, are expanded radially outwardly by the spring-like characteristics of the webs 42, 42a. This permits preassembly of the grommet 10, 10a to the workpiece 12 until, at a latter station in the assembly line, the leveling foot 16 can be screwed into the grommet in the normal fashion. Previously, cage nuts or weld nuts were used for this function and when the weld was broken or the cage became inoperative the nuts could not be readily replaced. Additionally the present device is economical to fabricate, is self-retaining, does not require any secondary operations for installation but rather can be simply pushed into a prepunched hole.

It will be appreciated that the specific configuration shown for the threads, the amount of thread engagement, and the configuration of the webs 42, 42a, in their generally circular disposition, is a matter of choice and other variations will be apparent to those skilled in the art.

Having thus shown the preferred forms of the invention it should be apparent that other construction and forms are considered to be within the scope of the invention and that the breadth of the invention is to be limited only by the scope of the claims.

I claim:

1. A one-piece self retaining threaded screw grommet adapted for acceptance in a complimentary non-circular apertured workpiece and for accepting a complimentary screw, said grommet including a circumferentially continuous head and a depending shank, a through bore traversing said head and said shank, said shank being bifurcated by a pair of slots which are each disposed substantially tangentially relative to said bore and positioned generally on opposite sides of the centerline of said bore, said slots forming a pair of leg portions each of which has external shoulder means intermediate its length, said legs being generally L-shaped in cross-section, each L-shaped leg having an apex, and a pair of elongated arcuate independently flexible members adjacent the free end of said shank and integral therewith, said members being opposite said head which controls the separation of said leg portions when said complimentary screw is threaded into said bore, said members each being bendable within its own length and extending substantially from one apex to the other of said L-shaped leg portions.

2. A grommet of the type claimed in claim 1 wherein said slots extend into said head.

3. A grommet of the type claimed in claim 2 wherein there is an interior surface having a molded thread form accessible through each of said slots, each said molded thread form includes a segment in said head.

4. A grommet of the type claimed in claim 1 wherein said head includes at least one thread segment.

* * * * *